United States Patent [19]

Rokutan

[11] Patent Number: 5,115,421
[45] Date of Patent: May 19, 1992

[54] OPTICAL RECORDING/REPRODUCING APPARATUS

[75] Inventor: Takao Rokutan, Higashimurayama, Japan

[73] Assignee: Olympus Optical Co., Ltd., Tokyo, Japan

[21] Appl. No.: 304,817

[22] Filed: Jan. 31, 1989

[30] Foreign Application Priority Data

Feb. 5, 1988 [JP] Japan .................. 63-24010

[51] Int. Cl.⁵ .............................................. G11B 7/00
[52] U.S. Cl. ................................................ 369/44.33
[58] Field of Search ............... 369/44.14, 44.25, 44.35, 369/44.36, 32, 112, 44.29, 44.31, 44.15, 44.16, 44.32, 44.33, 44.27, 44.28

[56] References Cited

U.S. PATENT DOCUMENTS

| | | | |
|---|---|---|---|
| 4,236,232 | 11/1980 | Jansen et al. | 369/32 |
| 4,425,043 | 1/1984 | van Rosmalen | 369/44.14 |
| 4,432,083 | 2/1984 | Hsieh et al. | 369/32 |
| 4,466,088 | 8/1984 | Trethewey | 369/44.14 |
| 4,554,652 | 11/1985 | Maeda et al. | |
| 4,615,023 | 9/1986 | Inada et al. | |
| 4,669,072 | 5/1987 | Miura et al. | |
| 4,718,050 | 1/1988 | Kurz et al. | 369/44.25 |
| 4,726,004 | 2/1988 | Takasago et al. | |
| 4,769,803 | 9/1988 | Yamamiya | 369/44.25 |
| 4,785,439 | 11/1988 | Okada et al. | 369/32 |
| 4,794,580 | 12/1988 | Ikedo et al. | 369/44.16 |
| 4,931,628 | 6/1990 | Wada | 369/44.11 |
| 4,963,781 | 10/1990 | Akiyama et al. | 369/44.35 |
| 5,003,524 | 3/1991 | Ikeda | 369/44.32 |
| 5,018,124 | 5/1991 | Ogasawara et al. | 369/44.33 |

FOREIGN PATENT DOCUMENTS

| | | | |
|---|---|---|---|
| 0098076 | 1/1984 | European Pat. Off. | |
| 186218 | 7/1986 | European Pat. Off. | 369/44.25 |
| 0246899 | 11/1987 | European Pat. Off. | |
| 58-189840 | 11/1983 | Japan | |

Primary Examiner—Donald McElheny, Jr.
Attorney, Agent, or Firm—Frishauf, Holtz, Goodman & Woodward

[57] ABSTRACT

A laser beam from a laser source is incident on a track of an optical card through an objective lens. Since the optical card is reciprocated along a track direction, the laser beam is scanned on the track. The light beam reflected by the optical card is guided to a photo-detector through the objective lens and a mirror. An objective lens actuator and an objective lens position sensor are arranged near the objective lens. The objective lens actuator performs tracking of the laser beam by moving the objective lens in a direction perpendicular to the track, and focuses the objective lens by moving it in a direction perpendicular to the optical card. The lens position sensor detects the displacement of the lens during tracking. A track-error signal generated from the photo-detector is supplied to the actuator through a phase compensate circuit and a power amplifier, thus performing tracking servo control. An output from the lens position sensor is supplied to an off-track detector. The off-track detector is constituted by a low-pass filter for cutting a high-frequency component, such as noise, a DC-cut circuit, and a window comparator.

6 Claims, 4 Drawing Sheets

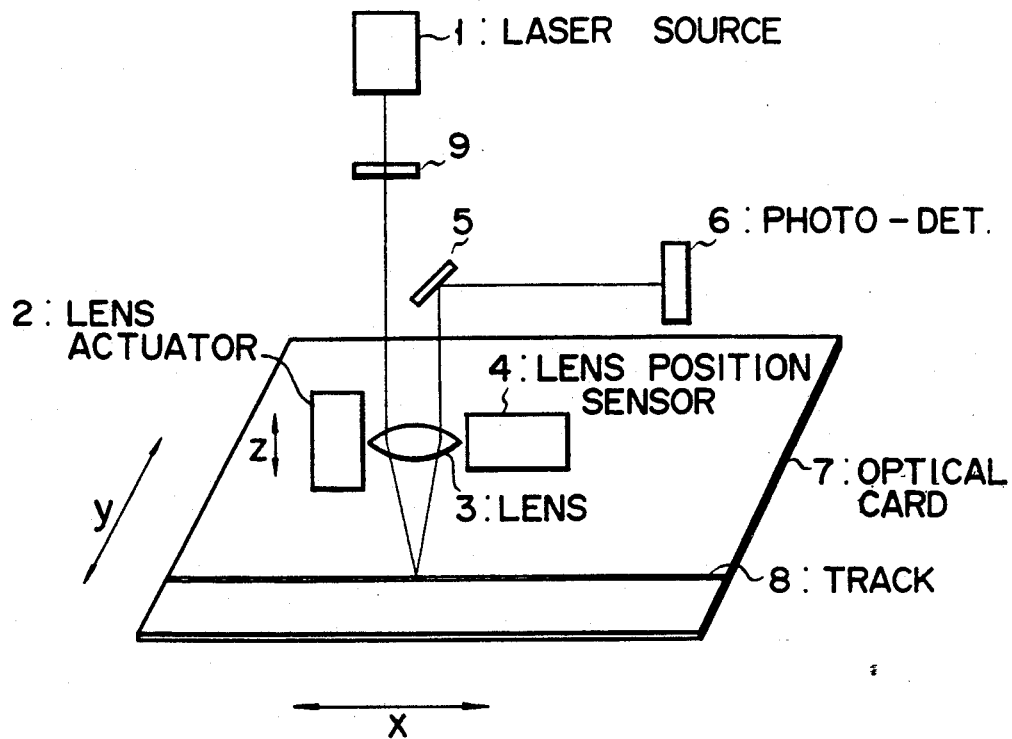
FIG. 1
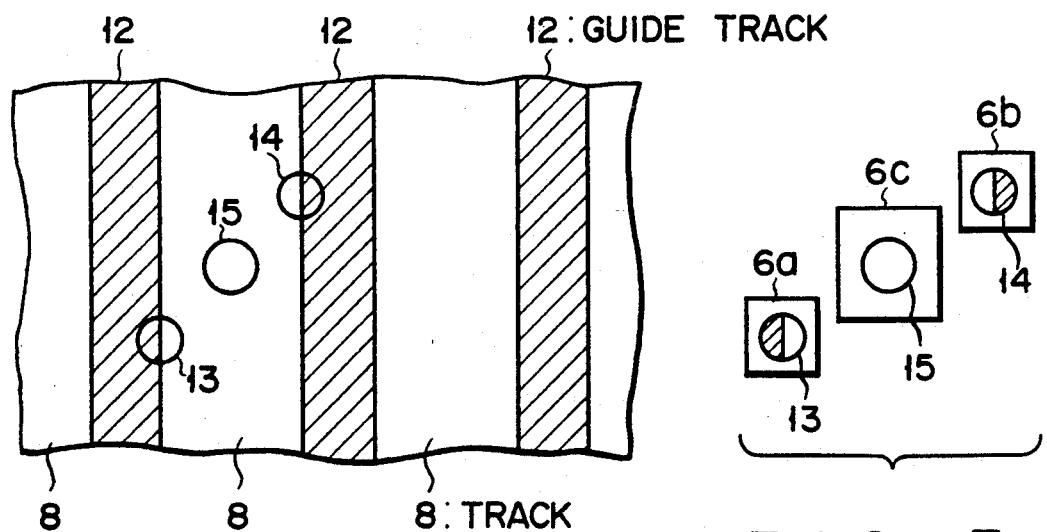
FIG. 2
FIG. 3

OPTICAL RECORDING/REPRODUCING APPARATUS

BACKGROUND OF THE INVENTION

1. Field of the Invention

The present invention relates to an optical recording/reproducing apparatus using an optical recording medium having a plurality of tracks arranged at a predetermined pitch, such as an optical disk or an optical card, and to detection of digression of a light beam from a target track during tracking servo control, i.e., off-track.

2. Description of the Related Art

Generally, in such a recording/reproducing apparatus, if an off-track state occurs during reproduction, a light beam scans a track which is different from a target track from which data should be reproduced. As a result, different data is reproduced in the course of the reproduction. If an off-track state occurs during a recording operation, data is recorded on a track which is different from a target track on which the data should be recorded. In this case, if the light beam digresses to a track on which data is already recorded, the recorded data is destroyed. During a recording/reproducing operation, therefore, an off-track or on-track state must be checked while tracking servo control is performed so as to scan a laser beam along the center line of the target track. When an off-track state is detected, the recording/reproducing operation is stopped and the laser beam is returned to the center line of the target track, thus preventing erroneous recording on another track during recording.

A digression detecting circuit for detecting an off-track state is disclosed in U.S. Pat. No. 4,554,652. This conventional digression detecting circuit determines off-track by using a track-error signal which is used for tracking servo control for moving an objective lens in a direction perpendicular to a track during scanning of the track by a laser beam and is increased or decreased when the difference between the center of the track and that of a laser beam spot is increased. The track-error signal is supplied first to a low-pass filter so as to cut a high-frequency component. A DC component is then removed from the signal by a DC-cut circuit. The signal upon removal of these components is compared with the upper and lower threshold values of a window comparator. If this signal is larger/smaller than the upper/lower threshold value, an off-track signal is output.

In this case, if dust or damage, such as a scratch, is present on a recording medium, such as an optical disk or an optical card, and a beam spot scans it, a track-error signal is disturbed in spite of an on-track state, and its level may become higher or lower than the upper or lower threshold value. As a result, this state may not be discriminated from a true off-track state, and hence an off-track state may be erroneously detected.

Note that if a rotary recording medium, such as an optical disk, is used, the jitter frequency component of a track-error signal due to dust or damage, such as a scratch, becomes high because the scanning speed of a light beam during a recording/reproducing operation is high, and hence the jitter component can be removed to a certain degree by a low-pass filter. Therefore, serious problem is not posed even in the above-described conventional apparatus. Furthermore, in an optical disk and the like, a protective layer on the surface of a recording medium is relatively thick, so that the size of a beam spot on the protective layer is larger than that of a beam spot on the recording medium layer due to refraction. Therefore, the dust or damage is very small with reference to a beam spot in an optical disk. For this reason, the influence of dust is reduced.

In an optical card, however, erroneous detection due to dust or damage, such as a scratch, poses a problem for the following reasons. In the optical card, the scanning speed of a light beam cannot be excessively increased because tracks are linearly formed. Therefore, the jitter frequency component of a track-error signal due to dust, a scratch, or the like, becomes low and differs less from the jitter frequency component of a track-error signal during an off-track period. For this reason, it is difficult to prevent erroneous detection due to the influence of dust, a scratch, or the like by simply removing a high-frequency component from a track-error signal using a low-pass filter. In addition, since the optical card is often carried by a user, it is more susceptible to damage by dust, a scratch, or the like than the optical disk. Moreover, the thickness of the protective layer of the optical card is decreased in order to increase portability, so that the size of a beam spot on the protective layer does not significantly differ from that of a beam spot on the recording medium layer. Therefore, the optical card is susceptible to the influence of dust, a scratch, or the like.

SUMMARY OF THE INVENTION

The present invention has been made to solve the above problems, and has as its object to provide an optical recording/reproducing apparatus which can reliably detect an off-track state in which a light beam digresses from a desired track even if an optical recording medium having a thin protective layer and requiring a low scanning speed of a light beam for a recording/reproducing operation is used.

According to the present invention, an optical recording/reproducing apparatus comprises a tracking mechanism for changing a position of an objective lens for radiating a light beam spot onto a track in a direction perpendicular to a track direction, and a detector for detecting the position of the objective lens so as to detect an off-track state when a distance between the detected position and a reference position is larger than a predetermined value.

In this manner, an off-track state is detected from the position of the objective lens, which is operated under tracking servo control, regardless of a track-error signal based on a light beam reflected by a recording medium. Therefore, even if dust or damage, such as a scratch, is present on a recording medium, such as an optical card, having a thin protective layer and requiring a low scanning speed of a light beam for a recording/reproducing operation, highly reliable off-track detection can be performed without being affected by the dust or the damage.

BRIEF DESCRIPTION OF THE DRAWINGS

FIG. 1 is a schematic block diagram showing an optical recording/reproducing apparatus according to an embodiment of the present invention;

FIG. 2 is a view showing a relationship between the positions of main laser and sub-laser beams on the recording medium for obtaining a track-error signal;

FIG. 3 is a view showing a relationship between the positions of main laser and sub-laser beams incident on three light-receiving elements;

DETAILED DESCRIPTION OF THE PREFERRED EMBODIMENTS

Figure 4:
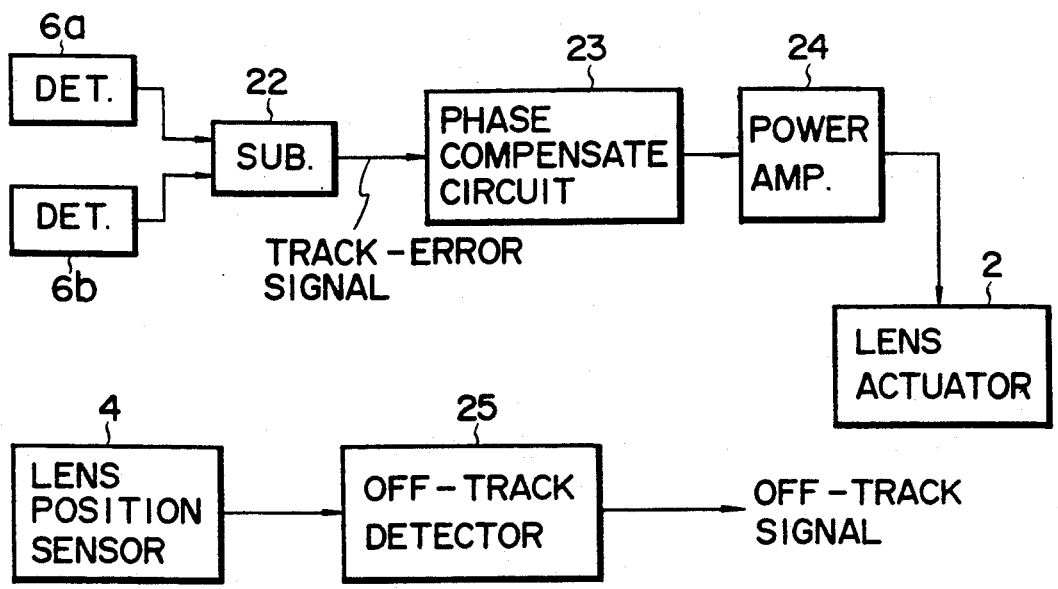
FIG. 4 is a block diagram showing a circuit arrangement of the embodiment.

FIG. 1 is a block diagram showing a schematic arrangement according to an embodiment of the present invention. A laser beam from a laser source 1 is incident on an objective lens 3 through a diffraction grating 9. The lens 3 focuses the laser beam on one of linear tracks 8 arranged on an optical card 7 at a predetermined pitch, thus forming a laser beam spot. The optical card 7 is reciprocated by a mechanism (not shown) along the x direction. As a result, the laser beam spot is scanned on the tracks 8. Note that the optical card 7 is shifted by a mechanism (not shown) in the y direction perpendicular to the track upon completion of one-track scanning in order to scan the next track.

The light beam reflected by the optical card 7 is incident on a mirror 5 through the lens 3. The light beam is then reflected by the mirror 5 to be guided to a photo detector 6.

An objective lens actuator 2 and objective lens position sensor 4 are arranged near the objective lens 3. The actuator 2 performs tracking control during laser beam scanning so as to cause a beam spot to be scanned on the center line of the track 8 by moving the lens 3 in the y direction. In addition, the actuator 2 also focuses the lens 3 by moving it in a direction (z direction) perpendicular to the optical card 7 during laser beam scanning.

The lens position sensor 4 detects the displacement (position) of the lens 3 in the y direction during tracking control.

The photo-detector 6 generates a track-error signal representing a difference between the center of a laser beam spot and the center of a given track so as to perform tracking. For this purpose, the laser source 1 radiates three beams at different positions in the y direction, respectively, as shown in FIG. 2, such that a main beam 15 is incident on the center line while sub-beams 13 and 14 are respectively incident on boundaries between the track 8 and corresponding guide tracks 12.

As shown in FIG. 3, the photo-detector 6 is constituted by three photo-detectors 6a, 6b, and 6c corresponding to the beams 13, 14, and 15, respectively, and outputs the difference between outputs from the photo-detectors 6a and 6b as a track-error signal. More specifically, when the main beam 15 is present on the center line of the track 8, the value of the track-error signal is 0. As the main beam 15 deviates from the center line of the track 8, the value of the track-error signal is increased.

FIG. 4 is a block diagram showing a circuit arrangement of the embodiment. Outputs from the photo-detectors 6a and 6b are supplied to a subtracter 22. The subtracter 22 outputs a track-error signal. The track-error signal is supplied to the lens actuator 2 through a phase compensate circuit 23 and a power amplifier 24. As a result, the lens 3 is driven so as to perform tracking servo control for causing a laser beam to be scanned on the center line of a given track.

In the meantime, an output from the lens position sensor 4 is supplied to an off-track detector 25 independently of the above system. An output from the off-track detector 25 is supplied to a read/write controller (not shown) to inhibit a recording/reproducing operation and the like.

Figure 5:
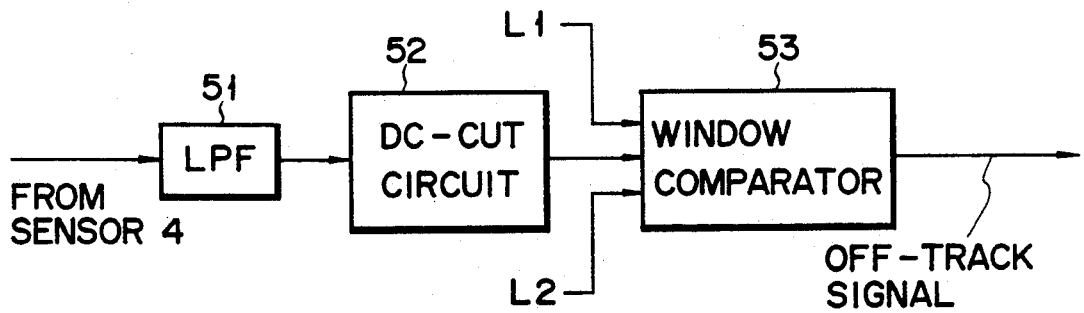
FIG. 5 is a block diagram showing an off-track detector in the embodiment.

FIG. 5 shows a detailed arrangement of the off-track detector 25. The output from the lens position sensor 4 is input to a low-pass filter (LPF) 51 so as to cut a high-frequency component, such as noise, from the output. An output from the LPF 51 is input to DC-cut circuit 52 so as to cut a DC component from the output. An output from the DC-cut circuit 52 is compared with two threshold values L1 and L2 by a window comparator 53. If the output from the DC-cut circuit 52 falls outside the range between the two threshold values L1 and L2, i.e., the lens is greatly moved, an off-track detection signal is output.

Figure 6:
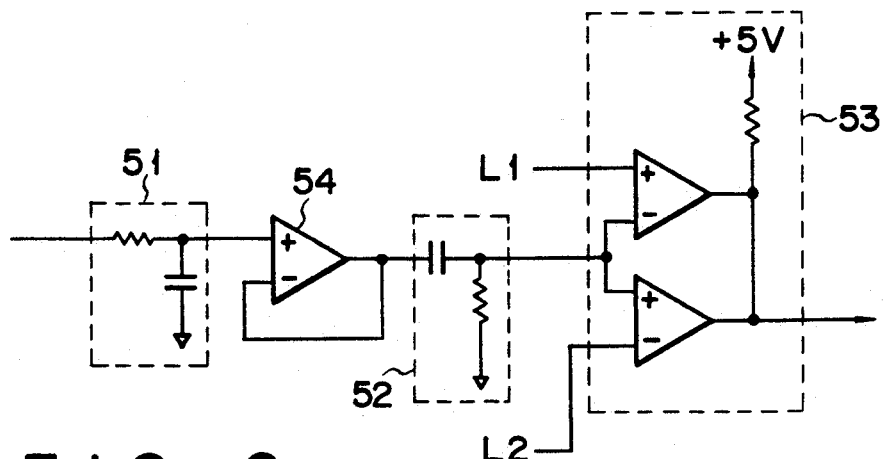
FIG. 6 a circuit diagram of the off-track detector shown in FIG. 5.

FIG. 6 shows a circuit diagram of the block diagram in FIG. 5. Voltage follower 54 is added for matching an impedance between LPF 51 and DC-cut circuit 52 in FIG. 6.

When the optical card 7 is inserted obliquely with respect to a reciprocating mechanism, and a laser beam is scanned in an oblique direction with respect to a track 8, tracking control is performed so as to slowly offset the lens 3 continuously in the oblique direction, and an output from the lens position sensor 4 falls outside the range between the threshold values L1 and L2. In this case, an off-track detection signal may be erroneously output in spite of the on-track state due to the tracking control. The DC-cut circuit 52 in the above-described arrangement is used to prevent such erroneous output of an off-track detection signal due to a slow offset of the lens 3.

Figure 7:
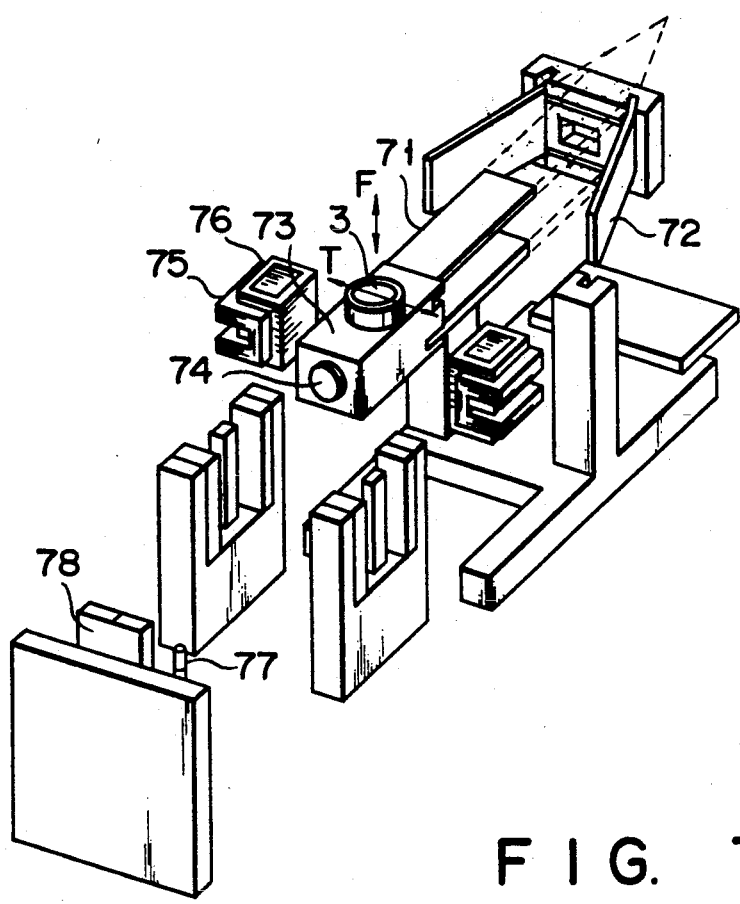
FIG. 7 is an exploded perspective view showing an objective lens position sensor in the embodiment.

The lens position sensor 4 is used to detect the position of the lens 3 during a tracking operation, and may be constituted by an optical sensor or an electrostatic capacitance sensor. FIG. 7 is an exploded perspective view of one such sensor. In this case, a sensor for performing optical detection is exemplified.

A mirror 74 is attached to a holder 73 of the lens 3, which is elastically supported by springs 71 and 72. Thus, the mirror 74 and the lens 3 are integrally moved. The holder 73 is displaced in tracking and focusing directions T and F by tracking and focusing coils 75 and 76, respectively. A light-emitting element 77 and a light-receiving element 78 which is divided into left and right sections (in the tracking direction T) are arranged so as to oppose the mirror 74.

Figure 8:
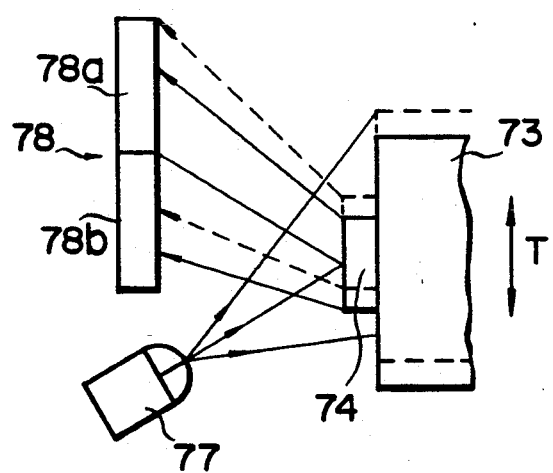
FIG. 8 shows an optical system of the objective lens position sensor.

FIG. 8 shows the detection principle of this lens position sensor. More specifically, a beam emitted from the light-emitting element 77 is reflected by the mirror 74, and is incident on the light-receiving element 78. When the lens 3 is moved in the tracking direction T by tracking servo control, the mirror 74 is also moved in the tracking direction T. Therefore, when the lens 3 is moved upward in the drawing, the incident position of the beam reflected by the mirror 74 onto the light receiving element 78 is shifted in the manner indicated by the broken lines.

Figure 9:
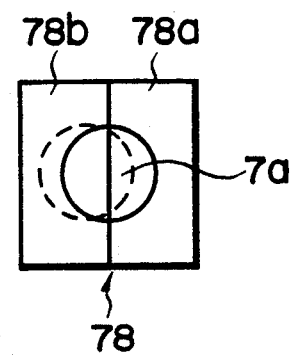
FIG. 9 shows the principle of the objective lens position sensor.

FIG. 9 shows the movement of the incident position of a reflected beam 79 on the light-receiving element 78. With this arrangement, the lens position sensor 4 can perform position detection of the mirror 74 in the tracking direction by obtaining the difference between outputs from the sections 78a and 78b of the light-receiving element 78. Since the mirror 74 and the lens 3 are integrally moved by the holder 73, position detection of the mirror 74 is equivalent to that of the lens 3.

Figure 10A:
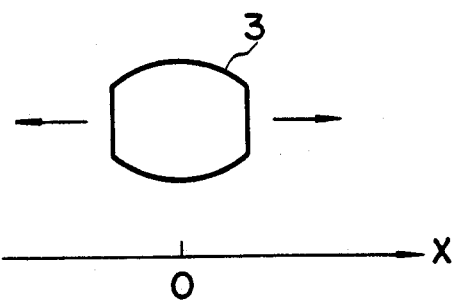
FIGS. 10A and 10B are graphs respectively showing an objective lens position and an output from the sensor.
Figure 10B:
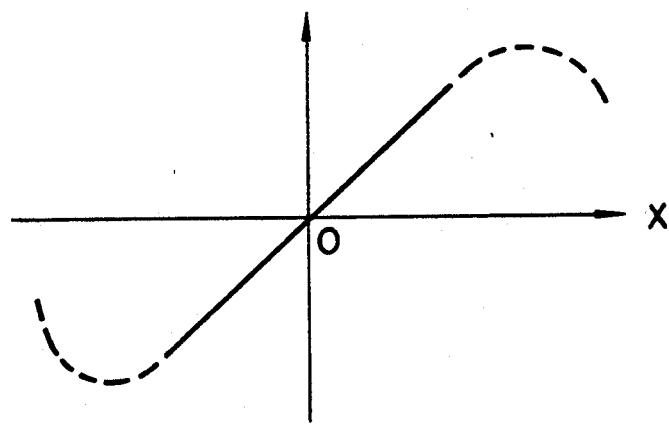

A position detection output from the lens position sensor 4 operated in this manner is changed in accordance with the position of the lens 3 (in FIG. 10A), as shown in FIG. 10B. When a beam spot digresses from a given track, it means that the lens 3 is moved in a direction perpendicular to the tracking direction. In this case, the output from the lens position sensor 4 is abruptly changed. If this abrupt change value becomes higher than the threshold level L1 or lower than the threshold level L2, an off-track detection signal goes to low level. This off-track detection signal is supplied to a circuit on the next stage, thus starting a predetermined operation.

Figure 11:
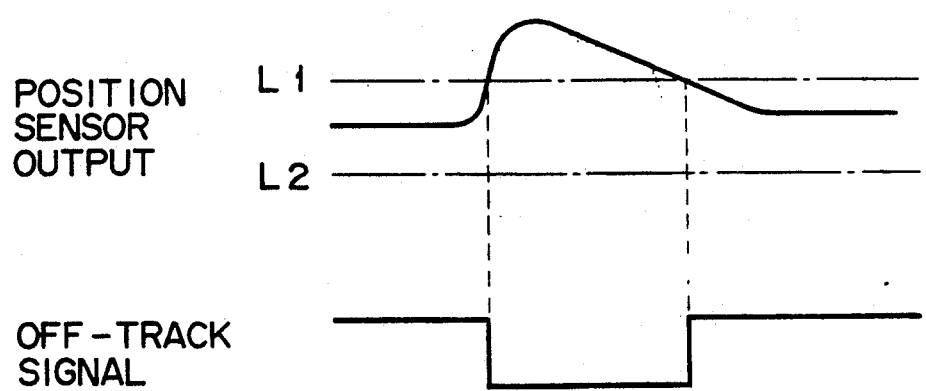
FIG. 11 is a timing chart showing a signal waveform during an off-track period.

FIG. 11 shows a signal waveform during an off-track detection period. Lens position detection and off-track detection signals are respectively plotted on the upper and lower sides. The lens position detection signal is quickly increased as a beam digresses from a given track, and reaches its peak when the beam is incident on another track. Thereafter, the level of the signal is gradually decreased by the DC-cut circuit.

When off-track is detected, the lens 3 is moved in the y direction so as to move a beam spot to a desired track on a recording medium for the following reason. When the beam spot is located on another track upon off-track, the lens position sensor output becomes constant, and the position detection signal returns to the inside of the window range, resulting in an on-track state. If a data recording/reproducing operation is performed in this state, an erroneous recording/reproducing operation is caused. Therefore, a predetermined operation must be performed. For example, during a recording operation, the data-recording is stopped upon a detection of off-track and the host controller is supplied with a signal representing that date is not able to write the sector. During a reproducing operation, the host controller is supplied with a signal representing that the data read out from the sector has an error. Note that the objective lens and a beam spot are moved in one-to-one correspondence.

As described above, an off-track state is detected by using an output from a lens position sensor for detecting a change in position of an objective lens for performing tracking servo control. According to this technique, since off-track detection is totally free from the influence of dust or damage, such as a scratch, on a recording medium, erroneous detection of off-track can be eliminated, unlike in the conventional technique wherein detection is performed by using a result of signal processing based on a track-error signal which is obtained by a light beam reflected by a recording medium.

The present invention is not limited to a recording/reproducing apparatus using the above-described optical card, but can be applied to a recording/reproducing apparatus using an optical disk. In addition, a sensor for detecting a change in electrostatic capacitance may be used as the objective lens position sensor.

What is claimed is:

1. An optical recording/reproducing apparatus using an optical recording medium having a plurality of tracks extending in a given track direction, comprising:
    an optical system for radiating a light beam onto a track of said optical recording medium;
    track-error detecting means for receiving a light beam reflected from said optical recording medium to detect a track error signal;
    tracking means for moving a portion of said optical system in a direction perpendicular to said track direction in accordance with the track error signal detected by said track-error detecting means so as to direct the light beam onto the track;
    off-track state detecting means for detecting a position of said portion of said optical system, and including means for detecting an off-track state when a distance between the detected position and a reference position exceeds a predetermined value during a tracking operation of said optical system by said tracking means; and
    means for stopping an operation of the optical recording/reproducing apparatus upon detection of the off-track state by said off-track state detecting means.

2. An apparatus according to claim 1, in which said portion of said optical system comprises an objective lens.

3. An apparatus according to claim 1, in which said optical recording medium comprises an optical card which includes parallel linear tracks on the entire surface of a card-like body at a predetermined pitch.

4. An apparatus according to claim 1, in which:
    said optical system comprises an objective lens supported by a spring, and
    said track-error detecting means comprises means for measuring a deviation of a center of a light beam from that of a track, and an actuator for changing a position of said objective lens in a direction perpendicular to the track direction in accordance with an output from said track-error detecting means.

5. An apparatus according to claim 1, in which said off-track state detecting means comprises optical detecting means for optically detecting a position of said portion of said optical system, a low-pass filter for removing a high-frequency component of the output from said optical detecting means, a DC-cut circuit for removing a DC component of the output from said low-pass filter, and a window comparator for checking whether the output from said DC-cut circuit falls within a certain level range.

6. An apparatus according to claim 5, in which said optical detecting means comprises:
    means for radiating a light beam on a holder of said optical system,
    light-receiving means, divided into two sections in the track direction, for receiving a light beam reflected by said holder, and
    means for obtaining a difference between outputs from said two sections of said light-receiving means.

* * * * *